United States Patent Office 3,429,869
Patented Feb. 25, 1969

3,429,869
MANNICH BASES OF TETRACYCLINE COMPOUNDS AND CARNOSINE
Carlos Ferrer Salat, Lauria 29, Jorge Ferrer Batlles, Vallmajo 18, and Juan Colome Riera, San Elias 34, all of Barcelona, Spain
No Drawing. Filed Sept. 15, 1965, Ser. No. 487,573
Claims priority, application France, Sept. 15, 1964, 988,203
U.S. Cl. 260—112.5
Int. Cl. C07d *49/30;* C07c *103/19*
4 Claims

ABSTRACT OF THE DISCLOSURE

A compound of the formula A—$CH_2$—P wherein A is selected from the group consisting of tetracycline, oxytetracycline and chlortetracycline, and wherein P is a polypeptide residue.

---

Tetracycline type antibiotics combined with a polypeptide retain their bacteriostatic power and acquire the advantage of higher and longer-lasting tetracycline blood levels, which allows to reduce or space its dosage and to reduce side effects to the minimum.

The present invention relates to products whose general formula is:

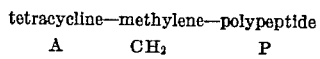

tetracycline—methylene—polypeptide
A          $CH_2$         P representing A the radical of an antibiotic of the tetracycline type (tetracycline, chlortetracycline, oxytetracycline), and their derivatives having an antibiotic activity; representing P the radical of a polypeptide, in particular the bipeptides, and among these, more specially those containing a diaminated acid (arginine, histidine, lysine).

A nonlimiting example of the compounds of this invention is:

Tetracycline—methylene—carnosine of M.W. 682.67.

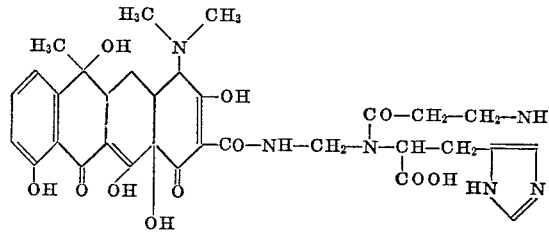

To prepare the product, suitable amounts of tetracycline and carnosine are reacted in the presence of formaldehyde in a boiling aqueous methanolic medium.

By progressive cooling, dilution with pure methanol and standing at 0° C., the hydrated crystalline complex precipitates (this reaction is known under Mannich's reaction). Lyophilization is possible as well.

It is obtained anhydrous by phosphoric desiccation.

The analysis confirms the formula described. The rotatory power of the product is different from that of its components; it is —174±10° at the concentration of 0.725 in hydrochloric acid N/10.

Hereinafter is described a nonlimiting example of the preparation method:

EXAMPLE

Introduce 111.1 g. of anhydrous pure tetracycline and then 1500 ml. of pure methanol. The product is rendered soluble by heating and stirring.

Prepare separately a solution of 56.5 g. of pure carnosine in 560 ml. of 50% methanol.

Introduce in the tetracycline solution a formaldehyde solution corresponding to 0.25 mol and, after homogenization, the carnosine solution.

The temperature of both the tetracycline and carnosine solutions should range about 50 to 60° C.

After mixing both solutions, allow to boil for 10 to 15 minutes.

Allow to cool, adding 350 ml. of pure methanol when cooled.

The cooling is prolonged at 0° C. for several hours, and the precipitate obtained is separated and dried at low temperature.

The product can be purified by redissolution in distilled water and subsequent precipitation by pure methanol.

It can also be lyophilized.

The foremost properties of the product are:

It is very soluble in water.

The aqueous solutions are stable for 24 hours at least, on an extensive pH range. The aqueous solutions prepared in a sterile form retain their inhibition power against the *Bacillus cereus* after being preserved for 6 days at +40° C.

The toxicity by parenteral way (intravenous) or by oral way is similar to that of tetracycline.

The bacterial spectrum is practically identical with that of tetracycline.

The tetracycline blood levels are higher with the product than with tetracycline, and this according to the results of the following experience:

The product according to the present invention, tetracycline-methylene-carnosine on the one hand, and tetracyline base on the other hand, are administered respectively to different rabbits in the following way:

On the day before the experience, two doses by oral way, of a quantity equivalent to 25 mg./kg. of tetracycline;

On the day of the experience, at the 0 time, an oral dose of a quantity equivalent to 60 mg./kg. of tetracycline.

Takings of blood are performed in sterile form after:

2 hrs.—3½ hrs.—5 hrs.—6½ hrs. and 9 hrs.

The dosage of the antibiotic activity is done by the disk method, using *Bacillus cereus*, var. micoides (ATCC 9634).

The results obtained are described below:

BLOOD-PLASMA CONCENTRATION OF TETRACYCLINE-CARNOSINE (T-C) AND TETRACYCLINE, IN γ PER ML.

| Hours | 2 | 3½ | 5 | 6½ | 9 |
|---|---|---|---|---|---|
| T   | 0.18 | 0.47 | 0.20 | 0.19 | 0.40 |
| T-C | 1.50 | 1.05 | 0.90 | 0.19 | 0.25 |

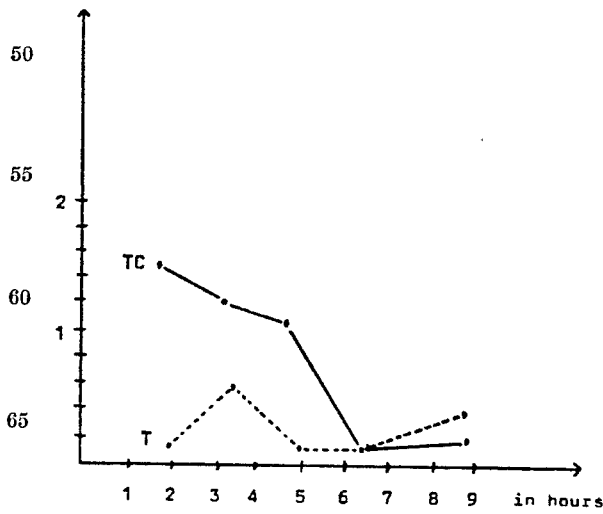

The product according to the invention can be used for antibiotic treatment of all infectious processes, by germs sensible to tetracycline, whatever its location in the organism, and specially:

cardiovascular system—respiratory s.—nervous s.—digestive s.—sensory s.—excreto-urinary s.—glandular s.—locomotor s.—skin and mucosas and otorhinolaryngologic sphere.

The aim of the invention is also a conditioned product with a view to its medicinal effectiveness as well as to the compositions contained.

We claim:

1. A compound of the formula A—CH$_2$—P wherein A is selected from the group consisting of residues of tetracycline, oxytetracycline chlortetracycline, and wherein P is a carnosine residue, and wherein the CH$_2$ group links the amido nitrogens of the A and P residues.

2. The compound having the formula:

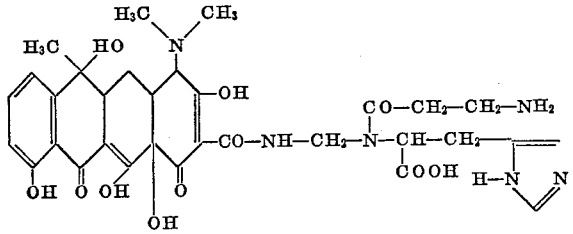

3. A compound having the formula A—CH$_2$—P wherein A is a chlortetracycline residue and P is a carnosine residue, and wherein the CH$_2$ group links the amido nitrogens of chlortetracycline and carnosine.

4. A compound having the formula A—CH$_2$—P wherein A is an oxytetracycline residue and P is a carnosine residue and wherein the CH$_2$ group links the amido nitrogens of oxytetracycline and carnosine.

References Cited

UNITED STATES PATENTS

| | | | |
|---|---|---|---|
| 3,218,335 | 11/1965 | Scevola | 260—326.3 |
| 3,228,962 | 1/1966 | McGregor et al. | 260—326.3 |
| 3,247,250 | 4/1966 | Tamorria | 260—559 |
| 3,272,817 | 9/1966 | Gordon et al. | 260—268 |
| 3,042,716 | 7/1962 | Blackwood et al. | 260—519 |

FOREIGN PATENTS 1,300,732  7/1962  France.

OTHER REFERENCES

Tubaro et al.: Chem. Abst. 55, 21074 (1961).

LEWIS GOTTS, *Primary Examiner.*

M. M. KASSENOFF, *Assistant Examiner.*

U.S. Cl. X.R.

260—559; 424—227, 177